(12) United States Patent
Herold

(10) Patent No.: US 12,502,946 B2
(45) Date of Patent: Dec. 23, 2025

(54) DRIVE SYSTEM FOR ARMORED ELECTRIC VEHICLES

(71) Applicant: AUDI AG, Ingolstadt (DE)

(72) Inventor: Philipp Herold, Neuburg (DE)

(73) Assignee: Audi AG, Ingolstadt (DE)

( * ) Notice: Subject to any disclaimer, the term of this patent is extended or adjusted under 35 U.S.C. 154(b) by 281 days.

(21) Appl. No.: 18/169,084

(22) Filed: Feb. 14, 2023

(65) Prior Publication Data
US 2023/0256806 A1 Aug. 17, 2023

(30) Foreign Application Priority Data
Feb. 15, 2022 (DE) .......................... 102022103469.0

(51) Int. Cl.
| | |
|---|---|
| B60K 6/442 | (2007.10) |
| B60K 6/28 | (2007.10) |
| B60K 6/40 | (2007.10) |
| F42B 3/00 | (2006.01) |
| F41H 7/00 | (2006.01) |

(52) U.S. Cl.
CPC ................ *B60K 6/442* (2013.01); *B60K 6/28* (2013.01); *B60K 6/40* (2013.01); *F42B 3/006* (2013.01); *B60Y 2200/92* (2013.01); *B60Y 2300/26* (2013.01); *B60Y 2400/112* (2013.01); *F41H 7/00* (2013.01)

(58) Field of Classification Search
CPC .. B60K 6/442; B60K 6/28; B60K 6/40; F42B 3/006; F41H 7/00
See application file for complete search history.

(56) References Cited

U.S. PATENT DOCUMENTS
| | | | |
|---|---|---|---|
| 9,221,343 B2* | 12/2015 | Tokarz | .................... B60L 58/10 |
| 12,145,431 B2* | 11/2024 | Wassmur | .................. B60L 3/04 |
| 2018/0159110 A1 | 6/2018 | Tuomola | |

FOREIGN PATENT DOCUMENTS
| | | |
|---|---|---|
| DE | 102004026237 A1 | 11/2005 |
| WO | WO 2011123808 A2 | 10/2011 |

* cited by examiner

*Primary Examiner* — John D Walters
(74) *Attorney, Agent, or Firm* — Seed Intellectual Property Law Group LLP

(57) ABSTRACT

Embodiments of the invention relate to a drive system for armored electric vehicles and a method for its operation in event of a fire of the traction battery.

10 Claims, 1 Drawing Sheet

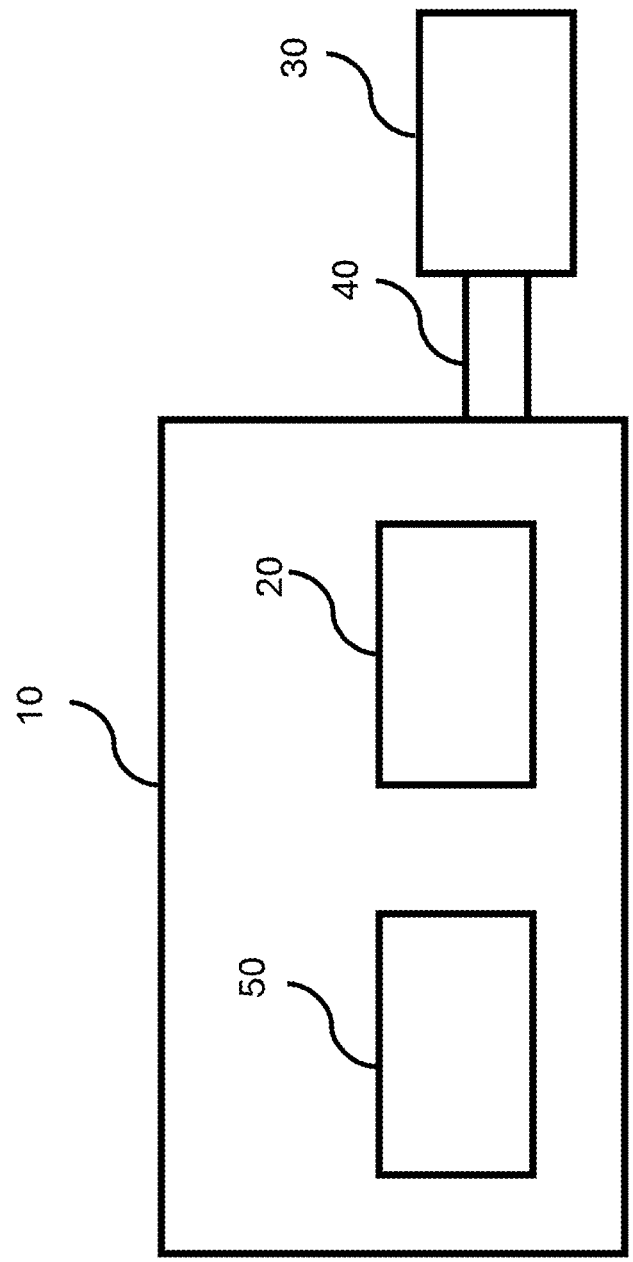

DRIVE SYSTEM FOR ARMORED ELECTRIC VEHICLES

BACKGROUND

Technical Field

Embodiments of the invention relate to a drive system for armored electric vehicles and a method for its operation in event of a fire of the traction battery.

Description of the Related Art

Electromobility will not stop, even for armored VIP vehicles for specially protected persons. With increasing range, electric vehicles in the near future can also be used on longer routes as a means of transportation for this group of persons. The development activities in this area are presently focusing on the mere protection of the passengers by strengthening the passenger compartment, as well as developing a weak responding battery system. However, both concepts quickly reach their limits in the extreme operational scenario of personal protection. In the event of an attack on or a striking of the vehicle and especially the HV battery, a "thermal runaway" of the HV battery can occur. There follows a chain reaction, resulting in a fire in all the single cells of the battery system with total loss of the vehicle. Furthermore, driving cannot continue due to safety shut-off circuits and structural damage to the cell assembly. An escape or continued driving of the person being protected is no longer assured in this case.

From DE 10 2004 026 237 A1 there is known a military wheeled vehicle with good mine protection, in which wheel axles and drive units are installed in the front and/or rear component and a residual mobility is assured by a preferably triple division of the vehicle body into front component, main component and rear component if the front component or the rear component is separated from the main component due to driving over a mine. A front component having at least one wheel axle and a rear component having at least one wheel axle are secured detachably at the front and rear to a main component by bolts having predetermined breaking points and/or explosive bolts which can be ignited by means of a built-in charge and exploded. In the front and/or rear component there is a combustion engine and/or an electrical drive motor, which then drives at least the one wheel axle in the front or in the rear component remaining on the main component after driving over the land mine.

US 2018/159 110 A1 discloses an electrical power supply system for use in an electric vehicle. The electrical power supply system comprises a tank, containing a plurality of batteries which are not secured to each other and which furnish electrical energy from the batteries to other systems of the vehicle. The tank comprises a release system, which can release some or all of the batteries from the tank or otherwise destroy them. Moreover, the system comprises a detector, which identifies an unwanted heating or thermal runaway of a battery within the plurality of batteries and causes the release system to release the batteries.

WO 2011/123 808 A2 relates to a battery system which monitors the status of a battery and assures safe conditions for a number of events affecting the safety of the battery cells, the battery pack or housing or a vehicle in which the battery is accommodated. In response to the safety event, the battery system provides one or more reactions in order to safeguard the battery, separate the battery, extinguish a fire, or maintain a safe temperature. Upon recognizing the safety event, the control system activates the safety device appropriately to assure safe conditions.

BRIEF SUMMARY

Some embodiments include a drive system for armored electric vehicles which prevents a burning of the entire vehicle even in event of a runaway or a fire in the traction battery and enables an escape or further driving of the person being protected.

BRIEF DESCRIPTION OF THE DRAWING

The FIGURE shows a schematic view of an armored motor vehicle according to an embodiment of the present disclosure.

DETAILED DESCRIPTION

Some embodiments include an armored motor vehicle 10 with electric drive 20, comprising a high-voltage ("HV") battery 30 for the energy supply of the electric drive 20, being removably connected by explosive connection elements 40 to the motor vehicle 10, and comprising a combustion engine 50 which is adapted to start and assure the propulsion of the motor vehicle 10 upon separation of the HV battery 30 from the motor vehicle 10, as shown in the FIGURE.

The HV battery 30 for the energy supply of the electric drive 20 (referred to as a "traction battery") of the armored motor vehicle 10 described herein is removably connected by explosive connection elements 40 to the motor vehicle 10. This allows for a total detachment of the HV battery 30 from the overall vehicle 10 in event of an attack on or a striking of the vehicle 10 in which the HV battery 30 is affected and responds with fire or explosion and smoke. Thus, the reaction of the HV battery 30 is prevented from extending to the vehicle 10.

Explosive connection elements 40, such as pyrotechnic elements, are used for the separating of the vehicle 10 and the HV battery 30. In one embodiment of the armored motor vehicle 10, the HV battery 30 is connected by explosive screws (similar to the door fastening in VIP armored vehicles) or explosive bolts to the motor vehicle.

A small combustion engine (internal combustion engine or ICE) 50, such as a 1.4 l TFSI combustion engine, serves for taking over the propulsion after separation of the HV battery 30. Thus, the continuing propulsion and hence the possibility of escape are assured.

In one embodiment of the armored motor vehicle 10, the combustion engine 50 is connected by a differential transmission in permanent and parallel manner to a drive train of the motor vehicle 10. In another embodiment, the combustion engine 50 is connected to a drive train of the motor vehicle 10 similar to a hybrid drive.

In another embodiment of the armored motor vehicle 10, the combustion engine 50 generates electrical energy for the operation of the electric drive 20. The combustion engine 50 works like a generator and generates enough power to continue operating the electrical drive 20 with the aid of a power electronics. In one embodiment, the armored motor vehicle 10 comprises an electrical independent wheel drive, i.e., each wheel is associated with a separate electrical machine. The combustion engine 50 works like a generator and generates enough power to continue operating the electrical drive (electric motor) 20 of at least one wheel with the aid of a power electronics. This assures the continued propulsion of the overall vehicle 10 in event of a failure of individual wheels or electric motors.

In one embodiment of the armored motor vehicle 10, it is not recognizable from the outside that the motor vehicle 10 has a combustion engine 50, in particular the exhaust gas system of the combustion engine is not visible from the outside. The installation of a combustion engine 50 for emergency situations remains hidden from outsiders, in order to achieve a further safety enhancement, since an attacker will not be expecting a redundant drive system.

Some embodiments include a method for operating the armored motor vehicle 10 described herein. In the method, upon overheating or fire of the HV battery 30 the connection between the motor vehicle 10 and the HV battery 30 is exploded and the HV battery 30 is entirely separated from the motor vehicle 10. Furthermore, the combustion engine 50 is started and thus assures the further operation of the drive of the motor vehicle 10.

In one embodiment of the method, the combustion engine 50 generates a torque which is coupled across a differential transmission into a drive train of the motor vehicle 10.

In another embodiment of the method, the combustion engine 50 generates electrical energy to supply the electric drive 20 of the motor vehicle 10. In another embodiment of the method, the motor vehicle 10 comprises an electrical independent wheel drive and the combustion engine 50 generates electrical energy to supply the electrical drive 20 of at least one wheel of the motor vehicle 10.

Among the benefits of the embodiments described herein is the fact that BEV vehicles can be used for personal protection in public. Thus, even long distances can be covered with purely electrically operated vehicles. In event of an attack on or a striking of the vehicle 10, the danger zone of the HV battery 30 and the extreme danger potential resulting from it are separated from the vehicle 10 and the passenger compartment. Thanks to the use of an ICE, the vehicle 10 however does not lose its propulsion ability, and thus the passengers are protected and have a chance to leave the danger area.

The features mentioned herein can be used not only in the particular indicated combination, but also in other combinations or standing alone.

German patent application no. 10 2022 103469.0, filed Feb. 15, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An armored motor vehicle with electric drive, comprising:
   a high-voltage battery for the energy supply of the electric drive, being removably connected by explosive connection elements to the motor vehicle, and
   a combustion engine which is adapted to start and assure propulsion of the motor vehicle upon separation of the high-voltage battery from the motor vehicle.

2. The armored motor vehicle according to claim 1, in which the electric drive is an electrical independent wheel drive.

3. The armored motor vehicle according to claim 1, in which the combustion engine is connected by a differential transmission in permanent and parallel manner to a drive train of the motor vehicle.

4. The armored motor vehicle according to claim 1, in which the combustion engine generates electrical energy for the operation of the electric drive.

5. The armored motor vehicle according to claim 1, in which it is not recognizable from the outside that the motor vehicle has a combustion engine.

6. The armored motor vehicle according to claim 5, in which the exhaust gas system of the combustion engine is not visible from the outside.

7. The armored motor vehicle according to claim 1, in which the high-voltage battery is connected by explosive screws or explosive bolts to the motor vehicle.

8. A method for operating an armored motor vehicle with electric drive including a high-voltage battery for the energy supply of the electric drive, being removably connected by explosive connection elements to the motor vehicle, and a combustion engine which is adapted to start and assure propulsion of the motor vehicle upon separation of the high-voltage battery from the motor vehicle, the method comprising:
   upon overheating or fire of the high-voltage battery, the connection between the motor vehicle and the high-voltage battery is exploded and the high-voltage battery is entirely separated from the motor vehicle and the combustion engine is started and assures further operation of the drive of the motor vehicle.

9. The method according to claim 8, in which the combustion engine generates a torque which is coupled across a differential transmission into a drive train of the motor vehicle.

10. The method according to claim 8, in which the combustion engine generates electrical energy to supply the electric drive of the motor vehicle.

* * * * *